United States Patent
Ougazzaden et al.

(10) Patent No.: US 6,780,241 B2
(45) Date of Patent: Aug. 24, 2004

(54) MONOLITHIC OPTICAL DEVICE MANUFACTURING AND INTEGRATION METHODS

(75) Inventors: Abdallah Ougazzaden, Breinigsville, PA (US); Justin Larry Peticolas, Jr., Wescoville, PA (US); Andrei Sirenko, Orefield, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 135 days.

(21) Appl. No.: 10/255,354

(22) Filed: Sep. 26, 2002

(65) Prior Publication Data

US 2004/0060503 A1 Apr. 1, 2004

(51) Int. Cl.[7] .............................................. C30B 25/04
(52) U.S. Cl. ........................ 117/89; 117/93; 117/97; 117/102; 117/104; 117/105; 117/923
(58) Field of Search ................................ 117/89, 93, 97, 117/102, 104, 105, 923

(56) References Cited

PUBLICATIONS

Jeong et al., "Effects on indium phosphide surface trap states ogf in situ etching and phosphurs–ntiride deposition", Journal of Applied Physics (1987) 62(6) pp. 2370–2375.*
Zhou et al., Monolithically integrated semiconductor active and passive optical wavegudies devices grwon by slective eepitaxy, Porceedings of SPIE 2000 pp. 118–128.*

* cited by examiner

*Primary Examiner*—Robert Kunemund (57) ABSTRACT

The present invention provides methods of manufacturing and integrating optical devices. In one embodiment, a method of integrating an optical device may include forming a first device over a substrate, and forming a second device over the substrate and adjacent the first device with a deposition gas having an etchant selective to a deposited component of the deposition gas.

20 Claims, 9 Drawing Sheets

MONOLITHIC OPTICAL DEVICE MANUFACTURING AND INTEGRATION METHODS

TECHNICAL FIELD OF THE INVENTION

The present invention is directed, in general, to communication devices and, more specifically, to methods of manufacturing and integrating monolithic optical devices.

BACKGROUND OF THE INVENTION

Optical fibers are key components in modern telecommunications and have gained wide acceptance. As is well known, telecommunication optical fibers are thin strands of glass capable of transmitting an optical signal containing a large amount of information over long distances with very low loss. Single fibers can carry multiple packets of data that are multiplexed on the fiber either by time division, where different slots of time are allocated to different packets, or by wavelenth division multiplexing, where different wavelengths are allocated for different data. Optical devices, such as modulators and switches, perform the important function of adding information content to optical signals in optical communications systems. Such devices may include expitaxially grown multi-quantum well type structures of an indium phosphide or indium gallium arsenide phosphide (InGaAsP) base. The quantum well type structures may be undoped, or may be doped with various n-type and p-type dopants.

Traditionally, the optical industry focused on hybrid integration of optical devices, wherein many optical devices are manufactured on individual optical substrates, all of which are subsequently connected by optical fibers. Hybrid integration was sufficient for traditional telecommunication devices. However, with the current increased demand for reliably carrying increased amounts of data, hybrid integration is problematic. Specifically, hybrid integration may experience poor optical coupling between the optical devices and the optical fiber, poor mechanical stability of the circuit, high cost, and low performance. Thus, in an attempt to circumvent some of the problems associated with hybrid integration, the current trend in the optical industry is to manufacture multiple optical devices on a single optical substrate. Manufacturing multiple optical devices on a single optical substrate, or so-called monolithic integration, is the ultimate solution to the problems discussed above. However, current manufacturing techniques each have problems associated therewith.

One manufacturing technique currently used to monolithically integrate multiple devices on a single optical substrate is called the "butt joint" technique. The butt joint technique typically consists of growing a first device structure, for example a laser, on the whole wafer, followed by selective etching and regrowth of an area not protected by a mask layer, and representing a second device. The butt joint technique currently allows for independent design of different devices and is used by many manufacturers. However, it commonly experiences certain problems at the junction between the first and second devices.

Because the second device typically grows substantially uniformly along all crystallographic planes, significant overgrowth occurs proximate the junction between the first and second device. Such overgrowth produces variations in the thickness of the second device or layers thereof. The overgrowth can also result in nonuniformity of material composition, for example of strain or inflection wavelength (see FIG. 2) across the second device. This is indicative of nonuniformity of molecular and/or crystalline structure. Accordingly, the butt joint technique may cause edge effect and material quality issues at the junction, as well as dislocations at the junction that may produce optical losses via absorption. The variations in molecular and crystalline structure at the junction between the first and second devices also contribute to poor optical coupling therebetween, high cost, low reliability, low yield and low performance of the integrated device.

Accordingly, what is needed in the art is a method to monolithically integrate multiple optical devices on a single optical substrate that does not experience the difficulties and problems associated with the prior art methods.

SUMMARY OF THE INVENTION

To address the above-discussed deficiencies of the prior art, the present invention provides methods of manufacturing and integrating optical devices. In one embodiment, a method of integrating an optical device may include forming a first device over a substrate, and forming a second device over the substrate and adjacent the first device with a deposition gas having an etchant selective to a deposited component of the deposition gas.

The foregoing has outlined an embodiment of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
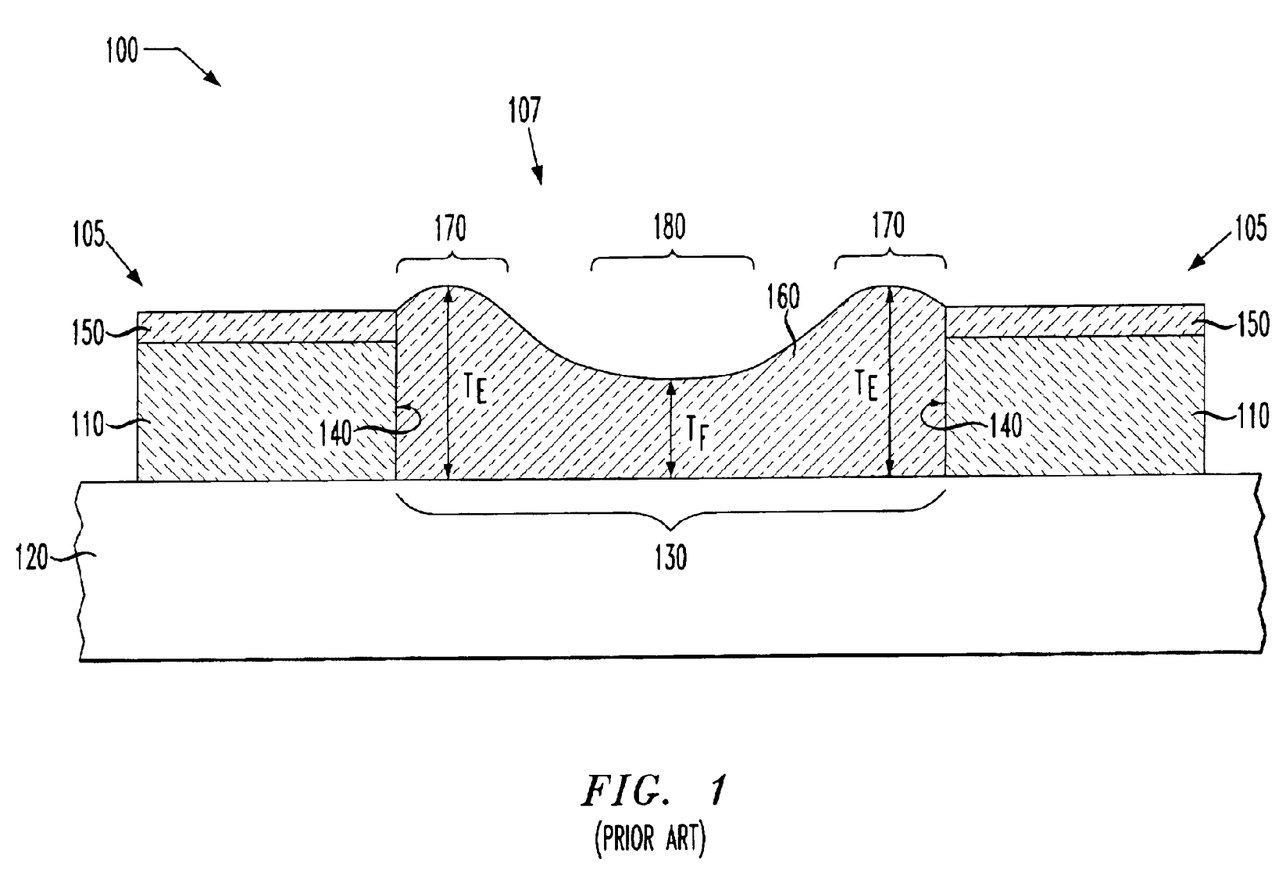
FIG. 1 illustrates an elevation view of a conventional integrated optical device at an intermediate stage of manufacture.

Referring initially to FIG. 1, illustrated is an elevation view of a conventional integrated optical device 100 at an intermediate stage of manufacture. The integrated optical device 100 includes a first layer 110 formed over a substrate 120 and having an opening 130 therein defined by two abutment edges 140. The first layer 110 may comprise any group III–V based material, including indium gallium arsenide, indium gallium arsenide phosphide or another similar material, and may form at least a portion of one or more first devices 105. A mask layer 150 is formed over the first layer 110. A second layer 160 is formed in the opening 130 and contacts at least one abutment edge 140 of the first layer 110. The second layer 160 may comprise indium gallium arsenide or indium gallium arsenide phosphide, and may form at least a portion of a second device 107.

As shown in FIG. 1, the second layer 160 does not exhibit laterally uniform composition. Laterally uniform composition has several characteristics. First, a layer of laterally uniform composition has substantially constant molecular composition across the span of the layer. For instance, the weight or volume percentage of a particular element in a laterally uniform composition remains substantially constant across the layer. Such uniform composition may be indicated by substantially uniform strain across the span of the layer. This uniform composition may also be indicated by uniform inflection wavelength across the span of the layer, which is the lowest wavelength (or effective bandgap) of light that may be passed through a specific material to cause absorption of the light and which may also be referred to as material wavelength.

Figure 2:
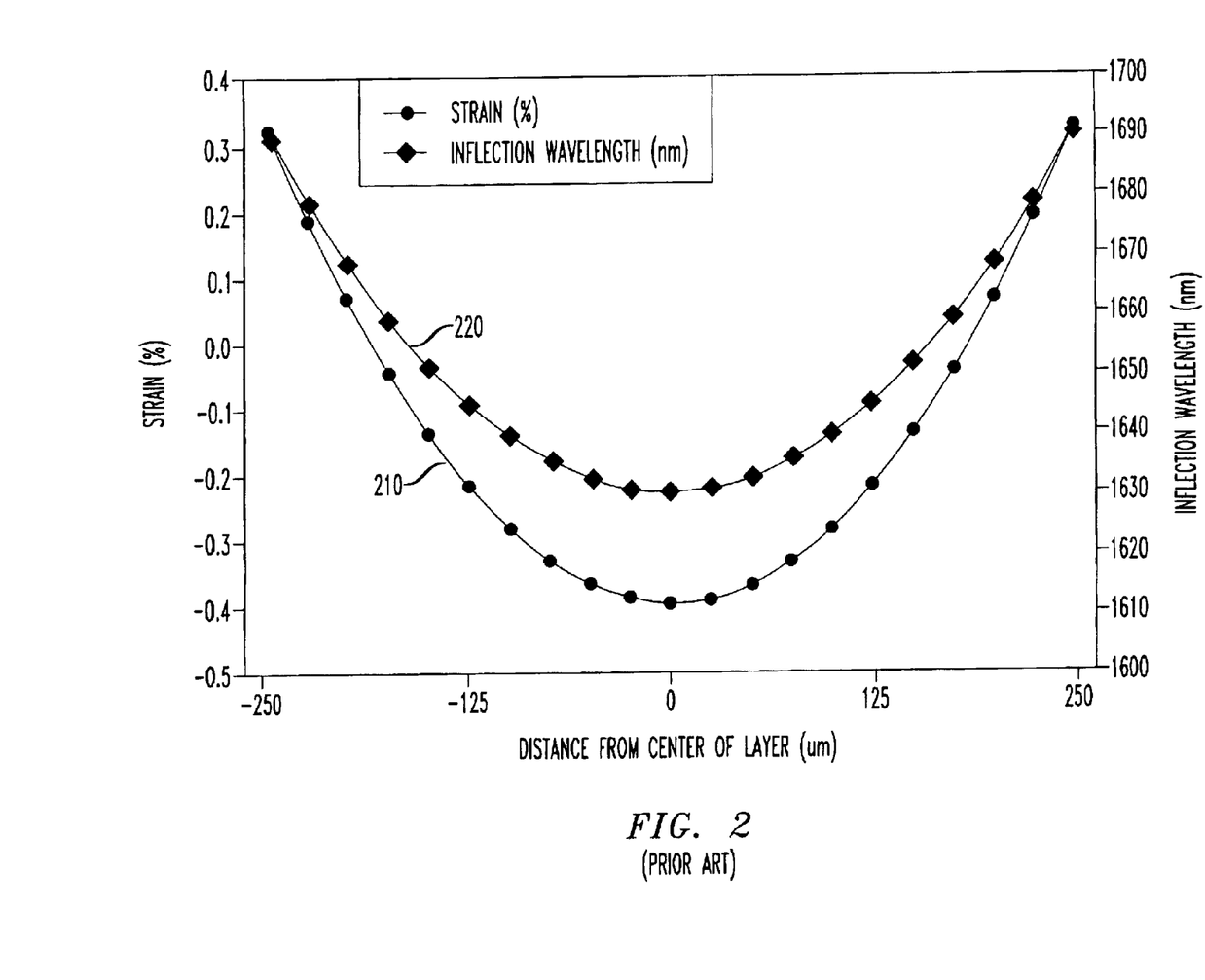
FIG. 2 illustrates a graph depicting the variation in strain and inflection wavelength across a conventionally formed layer of an optical device.

For example, turning to FIG. 2, illustrated is a graph depicting the variation in strain (percent) and inflection wavelength (nm) across a conventionally formed 500 µm wide feature that may be similar to the second layer 160 shown in FIG. 1. In the graph, values on both the strain curve 210 and the wavelength curve 220 are substantially elevated near the edges of the layer. Referring collectively to FIGS. 1 and 2, such nonuniformity is the result of excessive edge growth near the edges 170 of the second layer 160, especially near the abutment edges 140 (FIG. 1).

The nonuniformity of thickness (FIG. 1) and strain and wavelength (FIG. 2) is also indicative of nonuniformity of molecular and crystalline structure across the span of the second layer 160. As discussed above, this nonuniformity at the butt-joint between the first layer 110 and the second layer 160 contributes to poor optical coupling therebetween, high cost and low performance of the device 100. Moreover, this conventional butt-joint technique may experience edge effect and material quality issues at the junction, as well as dislocations that may produce optical losses by absorption.

A layer or device having laterally uniform composition also has a substantially constant thickness across the span of the layer. However, as shown in FIG. 1, the thickness T of the second layer 160 varies as it extends away from the abutment edges 140. That is, the second layer 160 has a substantially greater thickness $T_E$ at edge portions 170 proximate the abutment edges 140 than the thickness $T_F$ at a field region 180 centrally located in relation to the opening 130 in the first layer 110 and the mask 150.

Figure 3:
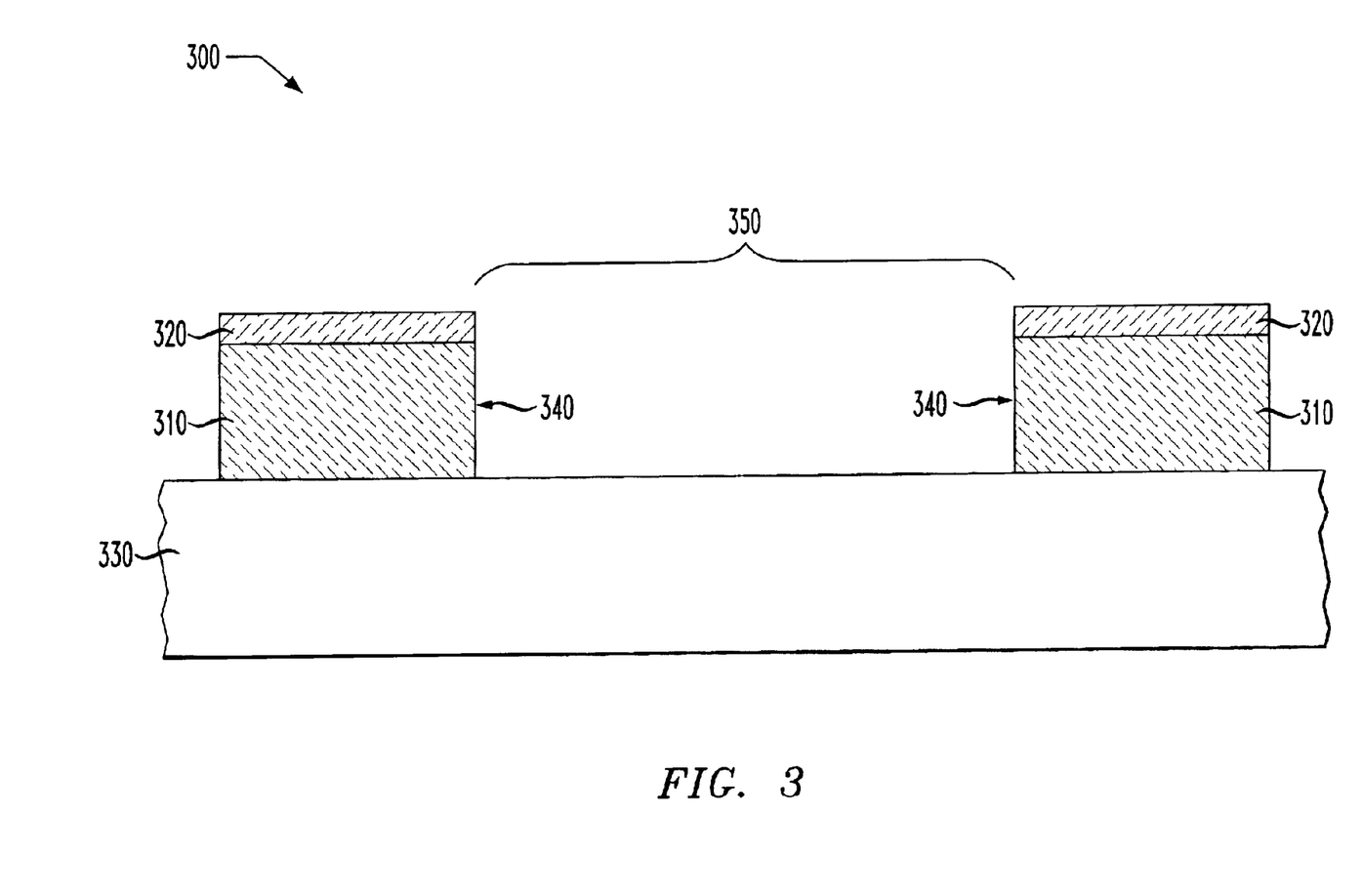
FIG. 3 illustrates an elevation view of one embodiment of an integrated optical device at an intermediate stage of manufacture according to the principles of the present invention.

Turning to FIG. 3, illustrated is an elevation view of one embodiment of an integrated optical device 300 at an intermediate stage of manufacture according to the principles of the present invention. The optical device 300 includes a first layer 310 and a mask 320 conventionally formed over a substrate 330, the first layer 310 having at least one abutment edge 340. An opening 350 is conventionally formed in the first layer 310.

In one embodiment, the opening 350 may be defined by a pair of abutment edges 340, or in an alternative embodiment, the opening may be defined by only one abutment edge. In a preferred embodiment, the first layer 310 may form at least a portion of a first optical device. In other embodiments, the first layer 310 may form at least portions of multiple optical devices. The first layer 310 may comprise indium gallium arsenide, indium gallium arsenide phosphide or other similar materials. In an advantageous embodiment, however, indium phosphide is used.

Figure 4:
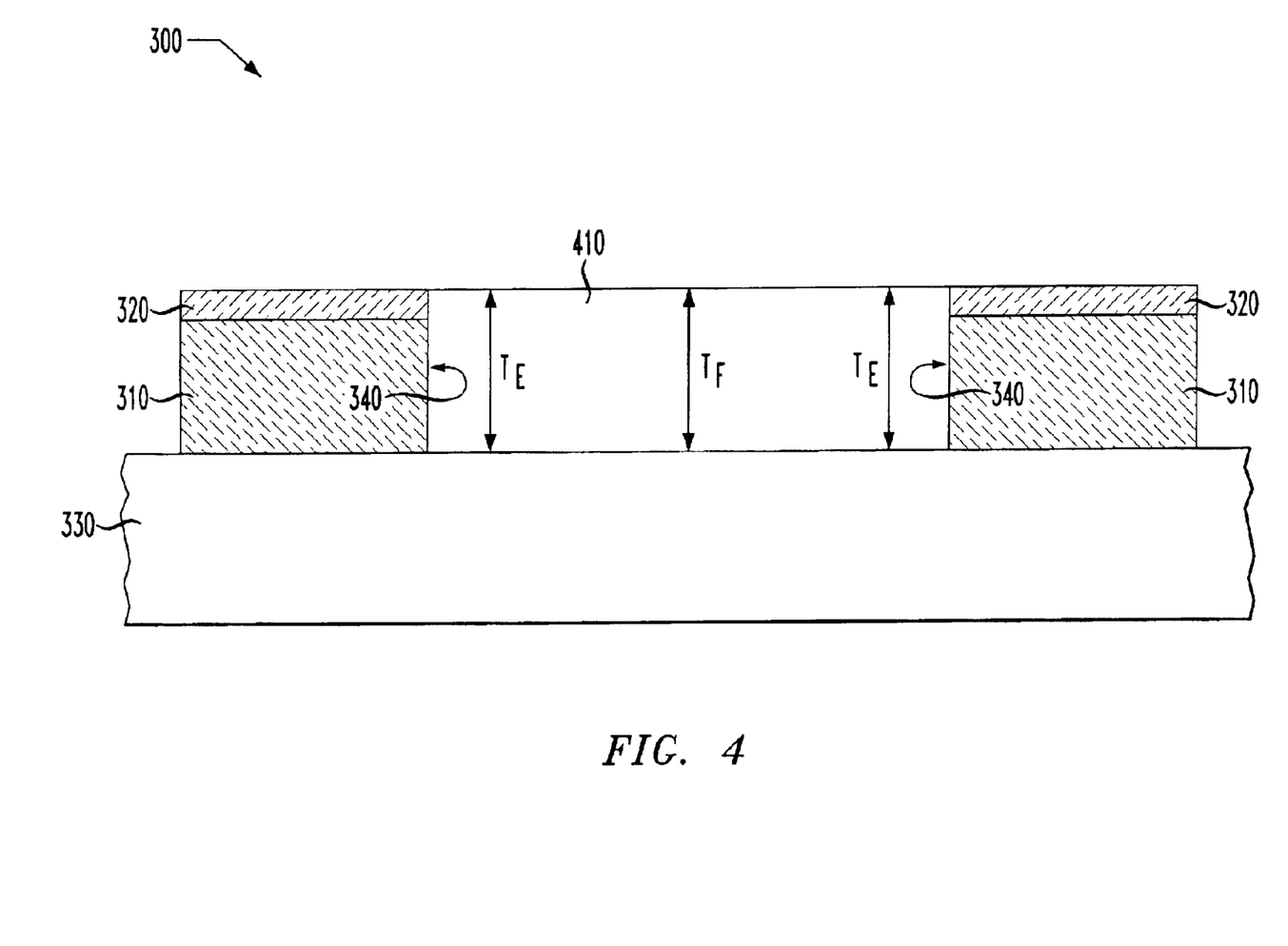
FIG. 4 illustrates an elevation view of the integrated optical device shown in FIG. 3 after the formation of a second device.

Turning to FIG. 4, illustrated is an elevation view of the integrated optical device 300 shown in FIG. 3 after the formation of a second layer 410 within the opening 350. The second layer 410, which may comprise indium gallium arsenide or indium gallium arsenide phosphide, may be formed with a deposition gas having an etchant selective to a deposited component of the deposition gas. In one embodiment, the etchant may comprise phosphorus trichloride ($PCl_3$), or another compound containing chloride or bromide. The etchant may be selective to a deposited deposition gas component having a predetermined crystallographic orientation, such as a 1,1,1 orientation. In an advantageous embodiment, the first layer 310 may be formed with a deposition gas substantially free of the selective etchant, and the second layer 410 may be formed with a deposition gas containing a substantial concentration of the selective etchant. Specifically, the second layer 410 may be formed with a deposition gas containing a concentration of the selective etchant ranging between about 2% and about 35%, by volume, of the active gases (e.g., indium and gallium) in the deposition gas. In one embodiment, the concentration of the selective etchant may range between about 5% and about 20%, by volume, of the active gases in the deposition gas. The concentration of the selective etchant may also range between about 0.03% and about 0.2%, by volume, of the total deposition gas, including carrier gases (e.g., hydrogen). In one embodiment, the concentration of the selective etchant may also range between about 0.03% and about 0.06%, by volume, of the total deposition gas.

In contrast to the second layer 160 shown in FIG. 1, the second layer 410 has a substantially laterally uniform composition and thickness extending away from each abutment edge 340. One indication that the second layer 410 has a substantially laterally uniform composition across the span between the abutment edges 340 is that it has a substantially uniform thickness. That is, the second layer 410 has substantially the same thickness $T_E$ proximate the abutment edges 340 as the thickness $T_F$ proximate a central portion of the second layer 410. Accordingly, in one embodiment, the thickness of the second layer 410 may vary by no more than about 5% across the span between the abutment edges 340. In addition, such substantially uniform thickness is attainable without employing any physical planarizing processes, such as chemical-mechanical planarization.

It has been unexpectedly found that forming the second layer 410 in the presence of $PCl_3$, or another compound containing a chlorine or bromine, causes the second layer 410 to have a substantially uniform composition as it extends away from the abutment edges 340. Growing the second layer 410 in this manner causes the second layer 410 to grow in certain specific planes, such as the high index 3,1,1 plane or the 1,0,0 plane. For instance, the second layer 410 may be grown in an environment including $PCl_3$ by MOVPE, MBE, LPE or another similar epitaxial process.

Figure 5:
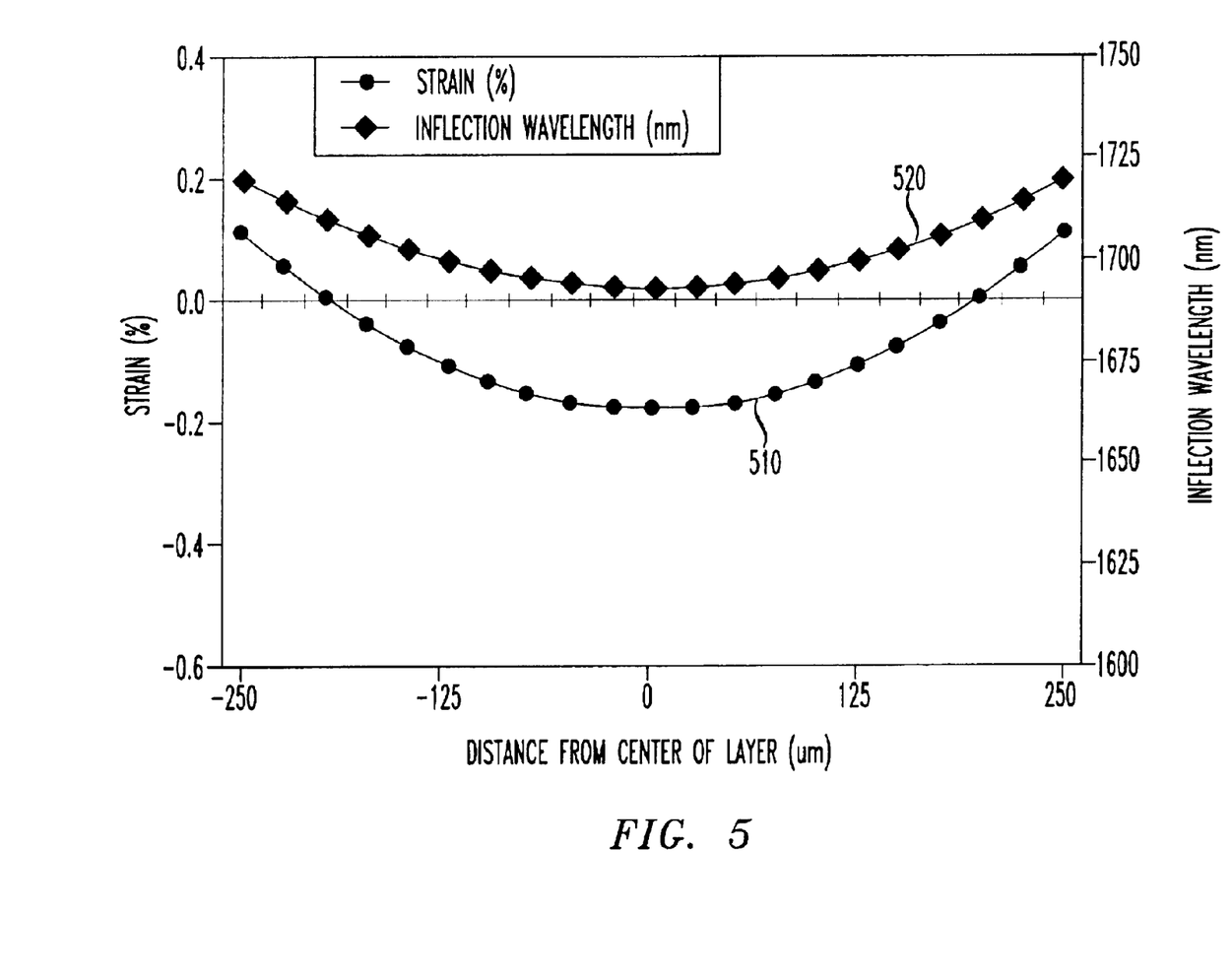
FIG. 5 illustrates a graph depicting the variation in strain and inflection wavelength for one embodiment of an optical device constructed according to the principles of the present invention.

As shown in the illustrative embodiment, forming the second layer 410 by growing the second layer 410 in selective crystallographic planes prevents the second layer 410 from developing non-uniformly. Growing the second layer 410 in selective crystallographic planes also prevents discontinuities in strain and inflection wavelength across the span of the second layer 410. For instance, as shown in FIG. 5, growing the second layer 410 in an environment having a $PCl_3$ flow rate ranging between about 0.1 sccm and about 0.3 sccm significantly reduces the variation in strain measurements 510 and inflection wavelength measurements 520 across a 500 nm layer by about 50–60%, as compared to growth in a $PCl_3$-free environment. Accordingly, the variation in strain and/or inflection wavelength in the second layer 410 may vary by no more than about 0.2% and 20 nm, respectively.

Figure 6:
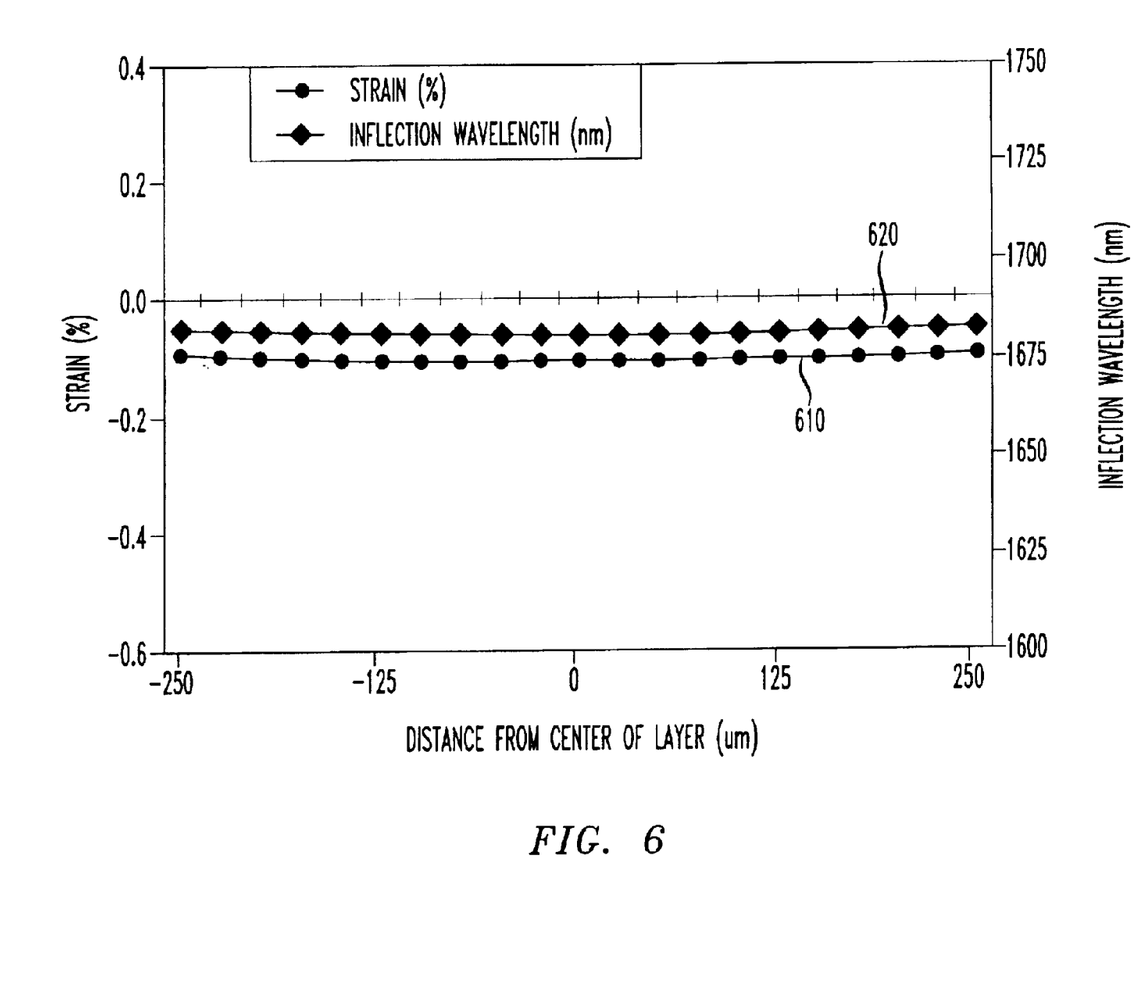
FIG. 6 illustrates a graph depicting the variation in strain and inflection wavelength for another embodiment of an optical device constructed according to the principles of the present invention.

However, as shown in FIG. 6, a preferred embodiment includes growing the second layer 410 in an environment having a $PCl_3$ flow rate ranging between about 0.3 sccm to about 0.5 sccm, resulting in a further reduction in variation of strain measurements 610 and inflection wavelength measurements 620 by more than about 95%, as compared to growth in a substantially $PCl_3$-free environment. Accordingly, the variation in strain and/or inflection wavelength across the span between the abutment edges 340 may vary by no more than about 0.03% and 2 nm, respectively. In such an embodiment, the second layer 410 may be grown at a temperature ranging from about 530 and 660° F., and at a pressure between about 50 mbar and atmospheric pressure.

Figure 7:
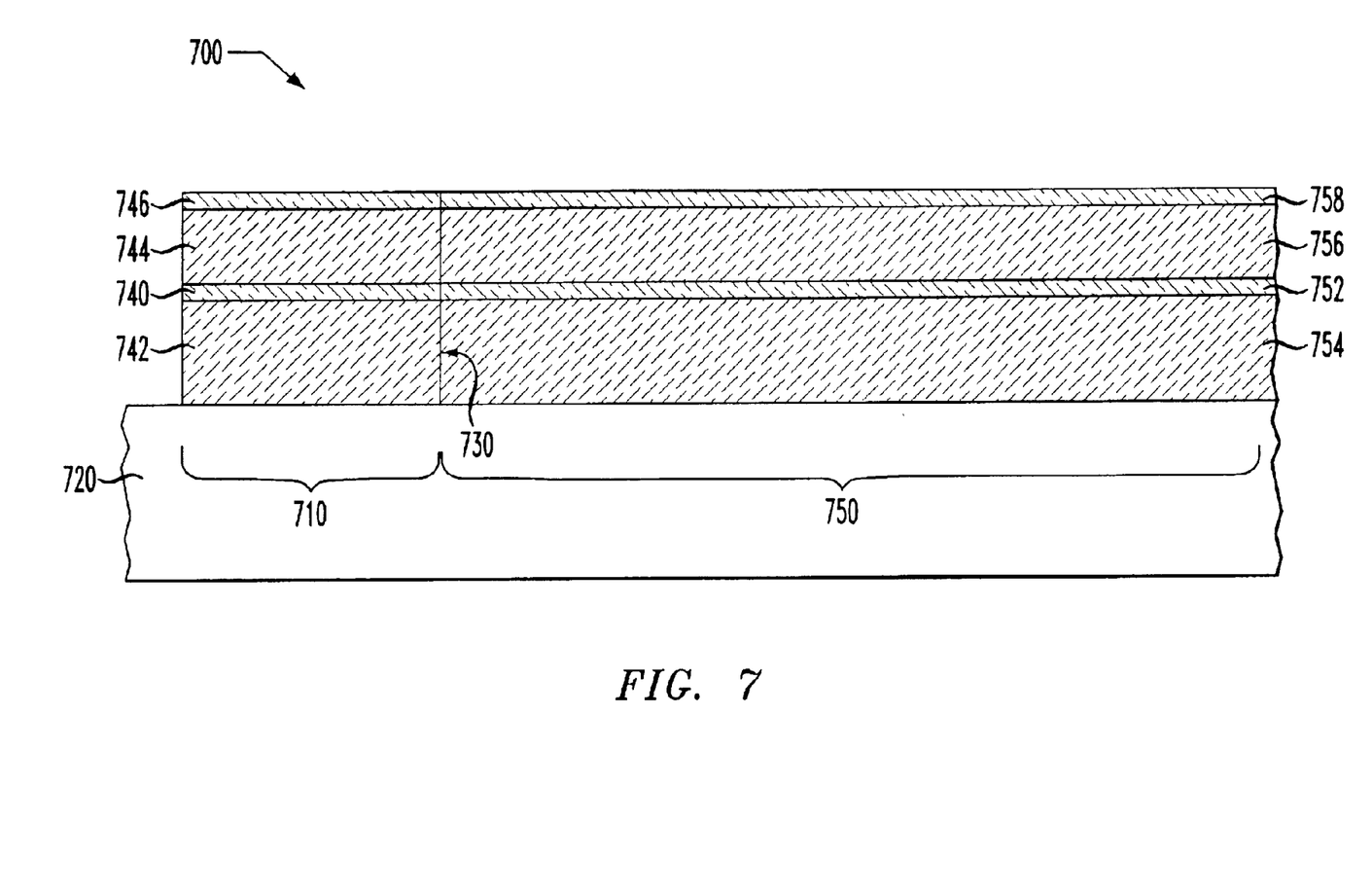
FIG. 7 illustrates an elevation view of another embodiment of an integrated optical device at an intermediate stage of manufacture according to the principles of the present invention.

Turning to FIG. 7, illustrated is an elevation view of another embodiment of an integrated optical device 700 constructed according to the principles of the present invention. The integrated optical device 700 includes a first optical device 710 located over a substrate 720. The first optical device 710 has an abutment edge 730 on at least one side thereof. The first optical device 710, which may be a laser, may include a core or active region 740, such as a waveguide or quantum well, formed between a lower cladding layer 742 and an upper cladding layer 744. In an advantageous embodiment, the core or active region 740 may comprise indium phosphide, and the cladding layers 742, 744 may comprise indium gallium arsenide or indium gallium arsenide phosphide. Another layer 746, which may be a mask, contact or additional cladding layer, may be formed over the upper cladding layer 744.

The integrated optical device 700 also includes a second optical device 750 abutting the first optical device 710 at the abutment edge 730. The second optical device 750 may be formed similarly to the formation of the second layer 410 of the integrated optical device 300 illustrated in FIG. 4. That is, at least a portion of the second optical device 750 may be formed with a deposition gas having an etchant selective to a deposited component of the deposition gas. Such formation may provide a substantially laterally uniform composition extending away from the abutment edge 730.

The second optical device 750, which may be a modulator, may include a core or active region 752, such as a waveguide or quantum well, between a lower cladding layer 754 and an upper cladding layer 756. In an advantageous embodiment, the core or active region 752 may comprise indium phosphide, and the cladding layers 754, 756 may comprise indium gallium arsenide or indium gallium arsenide phosphide. The second optical device 750 may also include another layer 758 over the upper cladding layer 756, such as a contact or additional cladding layer.

Figure 8:
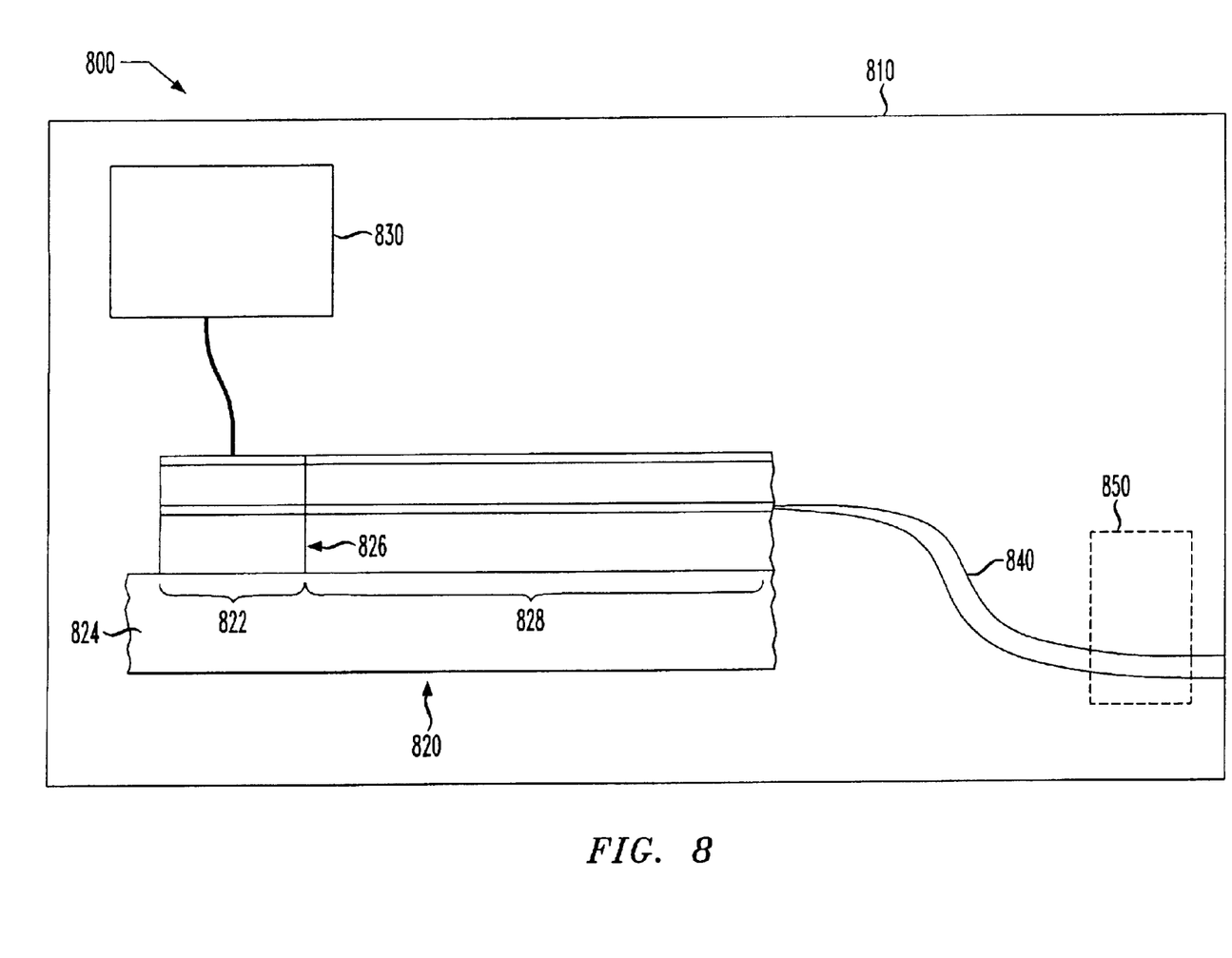
FIG. 8 illustrates a schematic view of one embodiment of an optical transmitter constructed according to the principles of the present invention.

Turning to FIG. 8, illustrated is a schematic view of one embodiment of an optical transmitter 800 which may form one environment in which the integrated optical device 300 and/or the integrated optical device 700 may be employed. The optical transmitter 800 may include a conventional housing 810. The optical transmitter 800 also includes an integrated radiation source 820 which, in one embodiment, may be similar to the integrated optical device 300 shown in FIG. 4 or the integrated optical device 700 shown in FIG. 7. The integrated radiation source 820 may include a first optical device 822, such as a laser, located over a substrate 824 and having an abutment edge 826 on one side thereof.

The integrated radiation source 820 may also include a second optical device 828, such as a modulator, adjoining the abutment edge 826 of the first optical device 822. The second optical device 828, or at least a portion thereof, may be formed in a manner similar to the formation of the second layer 410 of the integrated optical device 300 illustrated in FIG. 4 or the second optical device 750 of the integrated optical device 700 illustrated in FIG. 7. That is, at least a portion of the second optical device 828 may be formed with a deposition gas having an etchant selective to a deposited component of the deposition gas. Accordingly, the second optical device 828, or a portion thereof, may have a substantially lateral uniform composition extending away from the abutment edge 826, as described above with reference to FIGS. 4 and 7.

The optical transmitter 800 may also include a conventional electrical source 830 coupled to the integrated radiation source 820 to provide source current or voltage to power the first and/or second optical devices 822, 828. The optical transmitter 800 may also include a conventional waveguide 840 coupled to the integrated radiation source 820, to provide means for transmitting an optical signal from the integrated radiation source 820 to one or more components 850 within the optical transmitter 800, such as a PIN diode or a photodetector. The waveguide 840 may also be employed to transfer optical signals from the optical transmitter 800 to other components within an optical system (see FIGS. 9 and 10).

Figure 9:
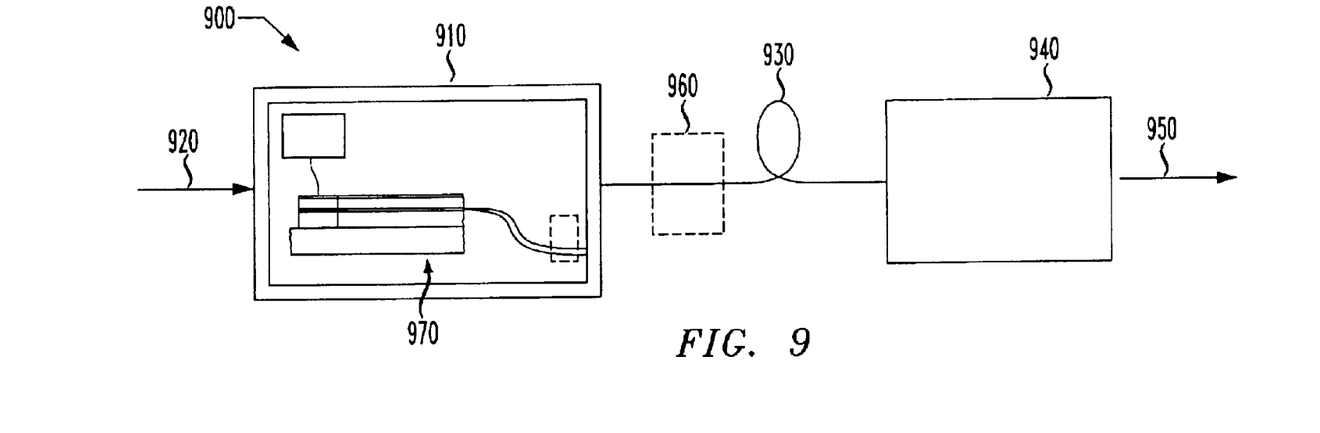
FIG. 9 illustrates a schematic view of one embodiment of an optical communication system constructed according to the principles of the present invention.

Turning briefly to FIG. 9, illustrated is an optical communication system 900, which may form one environment where an optical transmitter 910 similar to the optical transmitter 800 illustrated in FIG. 8 may be included. In the illustrative embodiment, the optical communication system 900 includes an initial signal 920 entering the optical transmitter 910. The optical transmitter 910 accepts the initial signal 920, processes the signal 920, and sends the resulting information across an optical fiber 930 to a receiver 940. In an alternative embodiment, the optical transmitter 910 may not receive an initial signal 920, but may instead generate an initial signal to be transmitted across the optical fiber 930.

The receiver 940 receives the information from the optical fiber 930, addresses the information in whatever fashion desired, and provides an ultimate signal 950. The optical communication system 900 is not limited to the devices previously mentioned. For example, the optical communication system 900 may include additional devices 960, such as additional lasers or diodes.

As illustrated in FIG. 9, the transmitter 910 may include an integrated optical device 970, which may similar to the integrated optical device 300 shown in FIG. 4 or the integrated optical device 700 shown in FIG. 7. In addition, the integrated optical device 970 may also be included anywhere in the optical communication system 900, including within the receiver 940.

Figure 10:
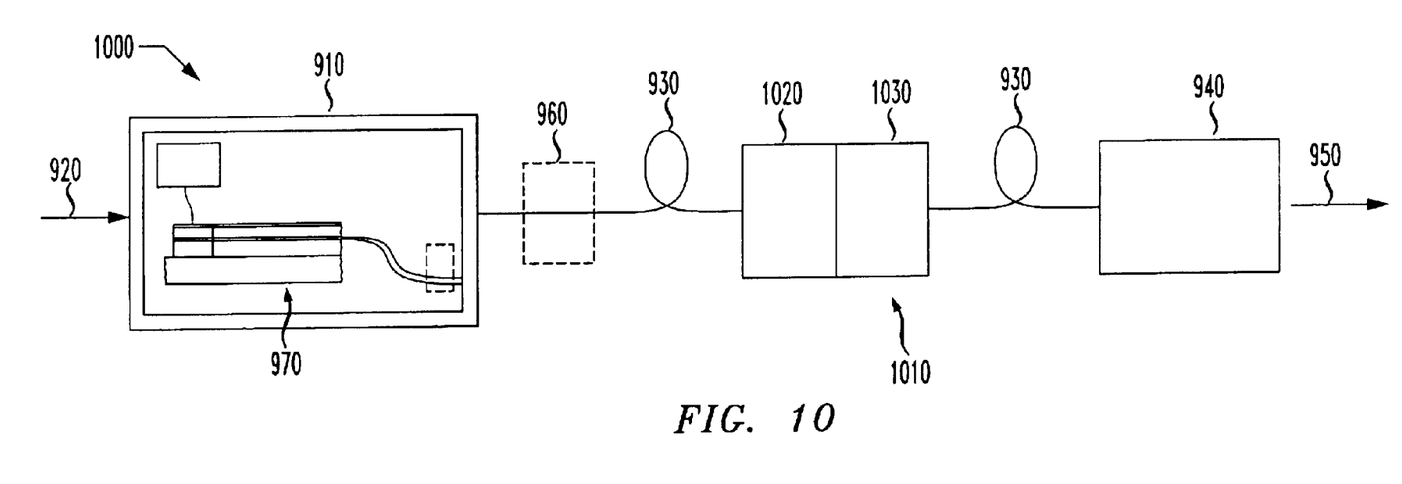
FIG. 10 illustrates a schematic view of another embodiment of an optical communication system constructed according to the principles of the present invention.

Turning briefly to FIG. 10, illustrated is an alternative optical communication system 1000 which may be similar to the optical communication system 900 illustrated in FIG. 9 except as discussed below. The optical communication system 1000 may include a repeater 1010, including a second receiver 1020 and a second transmitter 1030, located between the transmitter 910 and the receiver 940.

The present invention thus provides an optical device, an optical transmitter and a method for integrating optical devices employing a deposition gas having an etchant selective to a deposited component of the deposition gas. Accordingly, integrated devices may be joined by butt-joint structures but still have laterally uniform composition and thickness. As discussed, such laterally uniform composition advantageously reduces coupling and other optical losses arising from dislocations and the edge effect and material quality issues encountered with conventional butt-joint technology.

Although the present invention has been described in detail, those skilled in the art should understand that they can make various changes, substitutions and alterations herein without departing from the spirit and scope of the invention in its broadest form.

What is claimed is:

1. A method for integrating devices on an optical substrate, comprising:
   forming a first device over a substrate; and
   forming a second device over said substrate and adjacent said first device and with a deposition gas having an etchant selective to a deposited component of said deposition gas.

2. The method as recited in claim 1 wherein said first device has an abutment edge and said forming said second device includes forming said second device to have a laterally uniform composition extending from said abutment edge.

3. The method as recited in claim 1 wherein said etchant is phosphorus trichloride.

4. The method as recited in claim 1 wherein said etchant is selective to a deposited component having a 1,1,1 crystallographic orientation.

5. The method as recited in claim 1 wherein said forming said second device includes forming a first layer of indium phosphide with a deposition gas substantially free of said etchant and forming a second layer of indium gallium arsenide or indium gallium arsenide phosphide with a deposition gas containing a substantial concentration of said etchant.

6. The method as recited in claim 1 wherein said etchant includes a compound containing chloride or bromide.

7. The method as recited in claim 1 wherein said first device is a laser and said second device is a modulator.

8. A method of forming an optical device, comprising:
   defining an abutment edge of a first layer located over an optical substrate; and
   depositing a second layer adjacent said first layer and against said abutment edge, said second layer having a width and a substantially laterally uniform composition and thickness across said width.

9. The method as recited in claim 8 including forming said first layer with a first deposition gas.

10. The method as recited in claim 9 wherein said first deposition gas is substantially free of a selective etchant.

11. The method as recited in claim 8 wherein said depositing includes depositing said second layer with a deposition gas including a selective etchant.

12. The method as recited in claim 11 wherein said selective etchant is phosphorus trichloride.

13. The method as recited in claim 11 wherein said selective etchant includes chloride or bromide.

14. The method as recited in claim 11 wherein said second layer comprises indium gallium arsenide or indium gallium arsenide phosphide.

15. The method as recited in claim 11 wherein a concentration of said selective etchant ranges from about 2% to about 35%, by volume of active gases within said deposition gas.

16. A method of fabricating an integrated optical device, comprising:
   forming a first optical device over an optical substrate and having an abutment edge; and
   forming a second optical device over said optical substrate with a deposition gas having an etchant selective to a deposited component of said deposition gas, said second optical device abutting said first optical device.

17. The method as recited in claim 16 wherein said selective etchant is phosphorus trichloride.

18. The method as recited in claim 16 wherein said first optical device is a laser and said second optical device is a modulator.

19. The method as recited in claim 16 wherein said deposition gas includes active gases and a concentration of said etchant ranges from about % 5 to about 20% by volume of the active gases.

20. The method as recited in claim 19 wherein a concentration of said deposition gas ranges from about 0.03% to about 0.2% by volume of a total volume of said deposition gas.

* * * * *